United States Patent [19]

Reid et al.

[11] Patent Number: 4,583,998
[45] Date of Patent: Apr. 22, 1986

[54] SEPARATOR SYSTEM AND PROCESS FOR GAS CONDITIONING SOLUTIONS

[75] Inventors: Laurance S. Reid, P.O. Box 1188, Norman, Okla. 73070; Ector E. Barnhart, Oklahoma City, Okla.

[73] Assignee: Laurance S. Reid, Norman, Okla.

[21] Appl. No.: 442,891

[22] Filed: Nov. 19, 1982

[51] Int. Cl.⁴ .............................................. B01D 19/00
[52] U.S. Cl. .......................................... 55/45; 55/48; 55/186; 210/801; 210/804; 585/800
[58] Field of Search .................. 55/42, 44, 45, 48, 32, 55/49, 174, 175, 176, 208, 228, 163, 164, 192, 193, 183, 52, 186-188, 152, 41, 200, 202, 206; 210/694, 800, 801, 804; 585/800

[56] References Cited

U.S. PATENT DOCUMENTS

| | | | |
|---|---|---|---|
| 2,735,506 | 2/1956 | Glasgow | 55/206 |
| 2,738,026 | 3/1956 | Glasgow | 55/174 |
| 2,966,230 | 12/1960 | Cervinka | 55/193 |
| 3,025,928 | 3/1962 | Heath | 55/200 |
| 3,255,574 | 6/1966 | Glasgow | 55/176 |
| 3,389,536 | 6/1968 | Bull | 55/42 |
| 3,425,913 | 2/1969 | Holden | 210/521 |
| 3,460,677 | 8/1969 | Fifer | 210/521 |
| 3,826,740 | 7/1974 | Jewett | 210/521 |
| 3,837,811 | 9/1974 | Windal | 159/28 A |
| 3,867,112 | 2/1975 | Honerkamp | 55/175 |
| 4,059,517 | 11/1977 | Strahorn | 55/174 |
| 4,274,968 | 6/1981 | Grutsch | 210/694 |
| 4,289,505 | 9/1981 | Hordison | 210/694 |
| 4,328,013 | 5/1982 | Godare | 55/192 |

OTHER PUBLICATIONS

Chemical Engineers Handbook, Perry & Chilton, Fifth Edition, pp. 11-26.

Primary Examiner—David L. Lacey
Attorney, Agent, or Firm—Hubbard, Thurman, Turner & Tucker

[57] ABSTRACT

Gas conditioning glycol and alkanolamine solutions are treated for removal of gases and emulsified oils by passing the solution through a separator apparatus including an elongated cylindrical pressure vessel having a settling compartment with a length to diameter ratio of at least 6.0. The level of the liquid to be treated is maintained at approximately the horizontal centerline of the vessel by an oil overflow weir which decants the separated oil layer from the carrier liquid. The oil layer flows into a reservoir and is discharged from the vessel under the control of a level-controlled motor operated valve. The oil-conditioning liquid interface is controlled by an adjustable weir in the vessel disposed downwstream of the oil reservoir. A gas collection dome is disposed over the oil reservoir and includes mist separator pads for separating condensed liquids entrained in the separated gas. The incoming feedstream is controlled to limit the viscosity to 8.0 centipoises and is retained in the settling compartment by non-stir baffles and the level control weir for a residence time of from five to sixty minutes.

41 Claims, 12 Drawing Figures

SEPARATOR SYSTEM AND PROCESS FOR GAS CONDITIONING SOLUTIONS

BACKGROUND OF THE INVENTION

1. Field of the Invention

The present invention pertains to an apparatus and process for separating emulsified viscous liquids and dissolved gases and, in particular, for separating dissolved gases and hydrocarbon oils from glycols or alkanolamines used to dehydrate or desulfurize natural and manufactured gases.

2. Background

In gas conditioning operations such as dehydration and desulfurization processes the presence of crude as well as refined lubricating oils, hydrocarbon condensates, dissolved gases and particulate matter in the gas conditioning liquids create very tight emulsions and cause formation of inseparable foams. These emulsions and foams interfere with the desired absorption and reaction processes, and also with regeneration and reuse of the conditioning solutions. For example, in the dehydration of natural gas using various ethylene glycols as the absorbents, hydrocarbon oils become emulsified in the liquid glycol. Of course, dissolved gases usually also accumulate in the glycol solution. Emulsified oils in glycol conditioning liquids can reach the level where the emulsion inverts to glycol-in-oil which creates hazardous and ineffective operating conditions in the equipment used to regenerate these solutions.

Another problem in gas dehydration and desulfurization processes is the formation of substantial quantities of stable foams which are virtually impossible to separate, and so are entrained with the treated gases. When these foams escape from the processing equipment with the treated gas there is not only a substantial loss of the gas conditioning solution but serious contamination of the gas pipeline system is also experienced. The formation of these foams is promoted by contaminants in the process flowstream such as iron sulfides, iron carbonates, corrosion inhibitors and carbonaceous materials. It is known that the use of clean gas conditioning or treating solutions reduces or eliminates foam formation. It is to this end that it is important to provide for separation of hydrocarbon oils and dispersed solids whih are not soluble in the conditioning liquid and to provide for degassing the conditioning liquid before it is fed to the regeneration process.

Although the various glycols and hydrocarbon oils have substantial differences in density, separation by settling is hindered by the high viscosity of these liquids. Ethylene glycol and other glycol liquids are quite viscous at ambient temperatures, even those temperatures experienced in moderate climates in all seasons. Where there is an oil-in-glycol emulsion, the glycol viscosity controls the settling rate. Retention time in the settling process and turbulence resulting from the design of the separating apparatus itself have posed problems in separating hydrocarbon oils from gas conditioning solutions in gas dehydration and desulfurization processes. Furthermore, the presence of the emulsifiers mentioned previously herein tends to stabilize emulsions and hinders the separation processes. Moreover, in most contemporary processes of this kind, little or no attempt has been made to lower fluid viscosities by means of temperature adjustment and control.

Accordingly, there has been a substantial need for improvement in operating techniques and apparatus for separating hydrocarbon oils and dissolved gas from liquids such as ethylene, diethylene, triethylene, and tetraethylene glycols as well as aqueous treating solutions for sour gas such as alkanolamines in aqueous solutions ranging from 10 to 65 percent by weight of amine. Heretofore, separation of immiscible liquids of this type, together with the separation of dissolved gases, has been generally unsatisfactory and need for improvement has been evident. Accordingly, the apparatus and process of the present invention represents an important improvement in regeneration of conditioning solutions for dehydration and desulfurization of various gases.

SUMMARY OF THE INVENTION

The present invention provides improvements in the separation of dissolved gases and immiscible liquids dispersed in relatively viscous liquid solutions such as glycols and alkanolamines used as conditioning solutions for dehydration and desulfurization of natural and manufactured gases.

In accordance with one important aspect of the present invention there is provided an improved apparatus in the form of a separating vessel which is adapted to provide increased retention time, undisturbed settling space and uniform throughflow of the liquid being treated so that substantially all fluids exiting the apparatus have undergone a gas and liquid separation process. The improved separating apparatus is also adapted to provide means for maintaining a predetermined interface between the separated liquids in the vessel which will result in separation and accumulation of both liquids so that further treatment of the cleaned conditioning liquid will enhance the operation of the process. In this respect there is provided an apparatus which is particularly adapted to separate hydrocarbon oils and the like from enriched hydrophilic gas conditioning solutions wherein subsequent filtration of the solution through activated carbon will minimize oil contamination of the carbon filter bed.

The present invention also provides an apparatus which will provide an optimum gas-liquid interface in the vessel to permit separation of dissolved gases and conduction of these gases away from the separation vessel for demisting and condensation of vapors that are unwanted in the separated gas as well as in the conditioning solution.

In accordance with another aspect of the present invention a temperature-controlled separator vessel is provided with individual reservoirs for accumulating the separated liquids, and with an adjustable weir for controlling the interface level between liquid phases to assure that essentially all of the dispersed liquid is separated from the carrier liquid before the carrier liquid is discharged from the separator vessel. A separated layer of lower density dispersed liquid is decanted from the carrier liquid by an overflow weir extending horizontally across the vessel and defining one wall of the reservoir for the separated liquid. In particular, it has been determined that a generally cylindrical separator vessel should be provided having a length to diameter ratio substantially greater than 3.5 and preferably at least 6.0. The vessel should be arranged to have its longitudinal central axis extend generally horizontally and be filled to its centerline with the mixture to be separated. Such an arrangement together with the other parameters described in detail herein also provides for an improved process particularly adapted for separating dissolved gases and hydrocarbon oils and the like which are dispersed in gas conditioning solutions such as glycols and alkanolamines.

The present invention further provides a separator vessel having unique baffle structure adapted to provide for substantially laminar flow of liquid mixture of various degrees of emulsification or dispersal and of various viscosities and wherein complete flow through the vessel is provided to minimize any stagnation of liquid being treated.

In accordance with yet another aspect of the present invention there is provided a process for removing emulsified liquids from a viscous liquid carrier using a generally horizontally oriented, temperature-controlled, closed vessel which is filled to a predetermined level and is provided with improved flow controlling means which will enhance the retention and uniform flow of the fluids to promote the separation process, is capable of handling a continuous throughflow of liquid to be treated, can control fluid column depths, and has an optimum length to diameter ratio to provide the degree of separation required for quality control of liquids such as gas conditioning solutions.

The present invention further provides for a separation process wherein the temperature of the emulsified feed liquid is controlled, or a controlled amount of water dilution is employed, to limit the absolute viscosity of the liquid to 8.0 centipoises or less at all times during its residence within the separator apparatus. Normally, in gas conditioning solutions for gas dehydration or sour gas treating, temperature must be adjusted and maintained within the range of 140° to 200° F. to meet the constraints imposed by dimensional and residence time criteria incorporated into the design of the apparatus. In combination, these have a most profound effect on superior performance of multi-phase separation. Where ethylene glycol solutions with 20 percent or more water are employed, minimum temperature may be as low as 100° F., for example, governed by viscosity of 8.0 centipoises or less.

Those skilled in the art will further appreciate the above noted advantages as well as other superior features of the present invention upon reading the detailed description which follows.

DESCRIPTION OF THE PREFERRED EMBODIMENT

In the description which follows like parts are marked throughout the specification and drawings with the same reference numerals, respectively. Certain views of the drawings illustrate the apparatus of the present invention in somewhat schematic form in order that the features of the invention can be better illustrated in the interest of clarity and conciseness.

Figure 1:
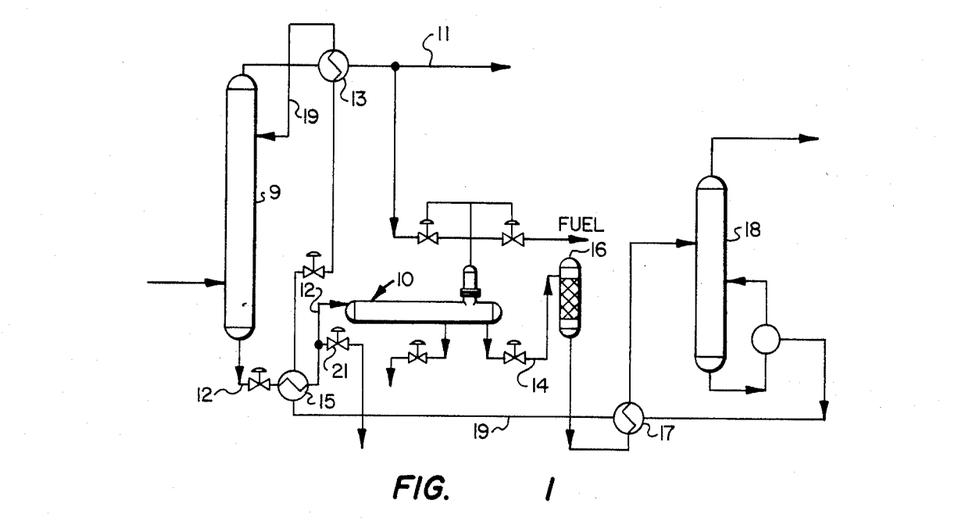
FIG. 1 is a schematic diagram of a gas conditioning system in accordance with the process and apparatus of the present invention.

Referring to FIG. 1 of the drawings there is illustrated a portion of a conditioning system for treating solutions used in the dehydration and desulfurization of natural and manufactured gases and the like. In the processing of natural gas, for example, it is necessary to desulfurize and/or dehydrate the gas prior to introduction into a gas transmission system or into a distribution network. In this regard there have been developed systems which utilize triethylene glycol as an absorbent for removing water vapor from the gas being treated. In this regard also, certain liquids such as alkanolamines are useful in desulfurizing natural and manufactured gases. FIG. 1 illustrates a gas conditioning system including an absorber tower, generally designated by the numeral 9, in which counterflow streams of untreated gas and liquid conditioning solution are brought into contact to purify the gas for further treatment or distribution through a conduit 11. The enriched conditioning liquid is recirculated through a regeneration system including apparatus comprising a three phase separator, generally designated by the numeral 10. The separator 10 receives conditioning liquid such as glycol contaminated with hydrocarbon oils and dissolved gases from the absorber 9 by way of a feed line 12. The separator 10 produces liquid-free gas, glycol-free oil and oil-free glycol.

The glycol or other conditioning solution which has been processed by the separator 10 is conducted by way of an outlet line 14 to a filtration unit, generally designated by the numeral 16. The filtration unit 16 is an elongated vertical vessel which is typically packed with activated carbon or other suitable adsorbent for filtering certain contaminants from the gas conditioning solution. The filtered solution is conducted to a regenerator unit 18 where water and other condensates which have not separated from the solution are distilled to produce highly-concentrated water-white glycol solution which is pumped back to the absorber tower by way of a conduit 19.

The system illustrated in FIG. 1 preferably also includes heat exchangers designated by numerals 13, 15, and 17, respectively, and interposed in the system as shown. The temperature of the feed solution in feed conduit 12 is controlled by passing the solution through the heat exchanger 15. The feed solution in conduit 12 can also be water diluted by injecting water into the solution through a conduit having a control valve 21 interposed therein for controlling the water inflow rate from a source, not shown.

The proper functioning of a gas dehydration system of the type described herein requires that liquid hydrocarbons and most dispersed solids be separated from the glycol before introduction into the activated carbon filtration unit. It is particularly important that any oil residue in the feedstream to the filtration unit 16 be avoided in order to prevent deactivation and ruination of the activated carbon. Moreover, it is also important, as mentioned previously, that the solution entering the regenerator and absorber be substantially free of emulsified oils. A substantially improved separator apparatus and process has been developed in accordance with the present invention which has been found to be particularly suitable for treating ethylene glycol, diethylene glycol and triethylene glycol used in natural gas dehydration systems. In fact, the separator apparatus and basic process of the invention described herein are also useful in regenerating systems for organic bases such as monoethanolamine, diethanolamine 2-(2-aminoethoxy)ethanol (Diglycolamine TM ) used in the removal of carbon dioxide, hydrogen sulfide and other sulfur compounds from natural gas.

Referring now to FIGS. 2 through 7, the separator apparatus 10 is characterized as an elongated, generally horizontally oriented pressure vessel having a thermally insulated cylindrical tubular body or shell 20 and opposed head portions 22 and 24 at opposite ends thereof. The heads 22 and 24 are preferably pressed steel closures which are suitably welded at seams 23 and 25 to opposed ends of the cylindrical steel shell 20. The vessel 10 also includes a generally vertically upstanding gas separator dome or tower 26 comprising a cylindrical vessel having a suitable flange 28 for connection to a matching flange 30 formed at the end of a short, vertical nozzle 32 installed in the shell 20. The separator vessel 10 is provided with suitable supports 34 and 36 so that it may be mounted substantially horizontally with respect to its longitudinal central axis.

Figures 2, 2A:
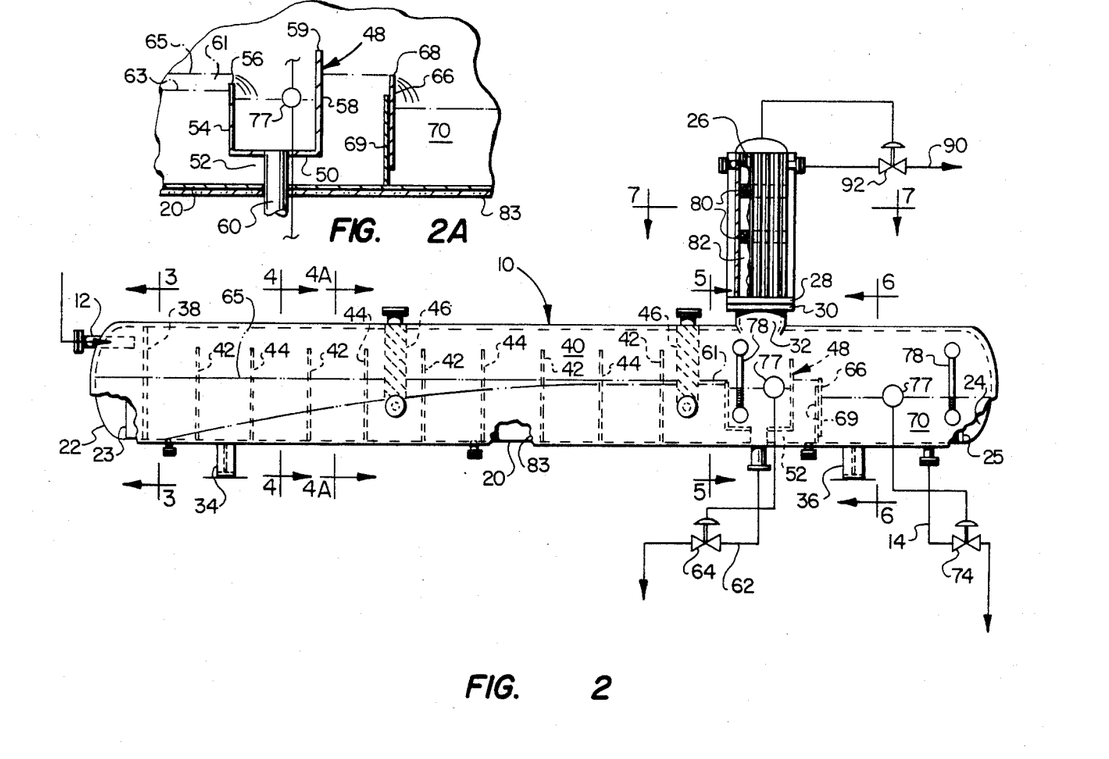
FIG. 2 is a longitudinal side elevation of the liquid and gas separating apparatus used in the conditioning system of FIG. 1.
FIG. 2A is a detailed longitudinal central section view on a larger scale showing the oil layer formed at the oil overflow weir and the separated liquid level control weir.
Figure 3:
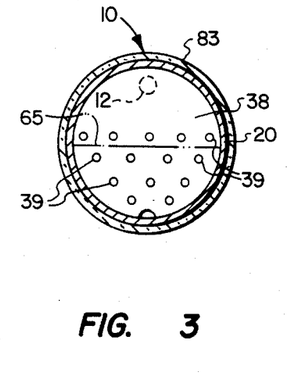
FIG. 3 is a section view taken substantially along the line 3—3 of FIG. 2 illustrating the flow dispersing structure.
Figure 4:
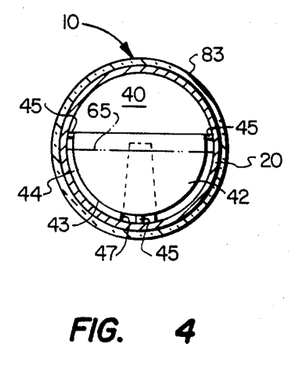
FIG. 4 is a section view taken along the line 4—4 of FIG. 2 illustrating the baffles in the setting compartment of the separator apparatus.
Figure 4A:
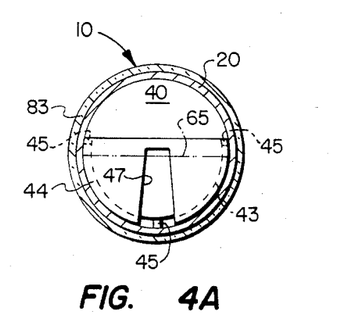
FIG. 4A is a section view taken along the line 4A—4A of FIG. 2.

Referring to FIGS. 2 and 3, the inlet conduit 12 is directed against a flow dispersing member, generally designated by the numeral 38, which is spaced from the end of the conduit 12 and is adapted to be impinged by the incoming flowstream of conditioning liquid containing oil and solids as well as dissolved gas dispersed throughout. The member 38 redirects the liquids generally downward in such a way as to reduce velocity while at the same time permitting some free gas to separate and collect in a chamber 40 representing generally the upper half of the interior of the separator vessel. The flow dispersing member 38 is provided with means to disperse the flowstream such as a pattern of openings 39 shown in FIG. 3, or a fixed centrifuge, not shown.

An important aspect of the present invention is the provision of means for retaining the conditioning solution in the vessel for a suitable length of time to permit separation of gas bubbles and the dispersed oil particles without agitating the solution in such a way that the emulsified oil and gas particles will remain dispersed and fail to adequately separate from the glycol or other carrier liquid. In this respect several important features of the structure of the apparatus 10 are provided. In order to assure total activity or movement of the body of fluid through the separator apparatus a series of spaced apart baffles 42 and 44 are provided within the interior of the shell 20. The baffles 42 and 44 may take several forms in accordance with the present invention and in accordance with the degree of emulsification and/or the concentration of oil in the carrier liquid. The baffles 42 and 44 are basically provided to assure that the liquid stream passing through the vessel 10 does not develop a short cut flow path to the outlets for only a portion of the flow while leaving a substantially stagnant or nonflowing portion along the vessel sides or bottom. Baffles of various configurations are provided of a type that develop full retention without mixing or re-mixing. Accordingly, one form of baffle set comprises alternate spaced apart plates 42 which have a circular peripheral edge 43 of a diameter less than the diameter of the inner wall of the shell 20 and are supported by suitable brackets 45 in spaced relationship to the shell wall to define an annular slotlike flow passage. As shown also in FIGS. 4 and 4A the baffles 44 are characterized as platelike elements having a circular edge contiguous with the inner wall of the shell 20 and a generally trapezoidal shaped opening 47 formed therein and substantially symmetrical about the vertical longitudinal center plane of the shell. The flow area formed by the opening 47 is preferably equal to the flow area formed by the passage between the peripheral edge 43 of the baffle plate 42 and the inner wall of the shell 20. The preferred spacing between the baffles 42 and 44 has been determined to be about two feet or a distance equal to the diameter of the vessel shell, whichever is less, and the average linear velocity of the fluid is kept in the laminar flow range in passing through the flow passages formed by the baffles.

Figure 9:
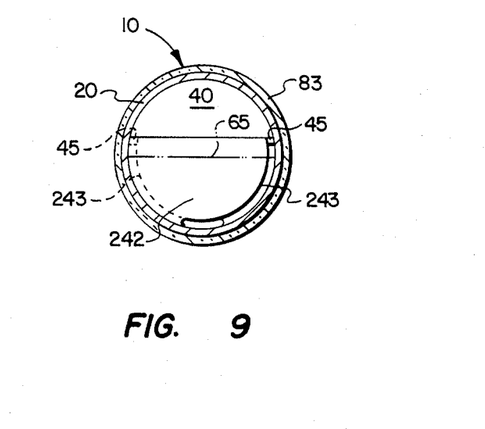
FIGS. 9 and 10 are views taken along the same line as the view of FIG. 4 of alternate baffle arrangements for the settling compartment of the apparatus of FIG. 2.
Figure 10:
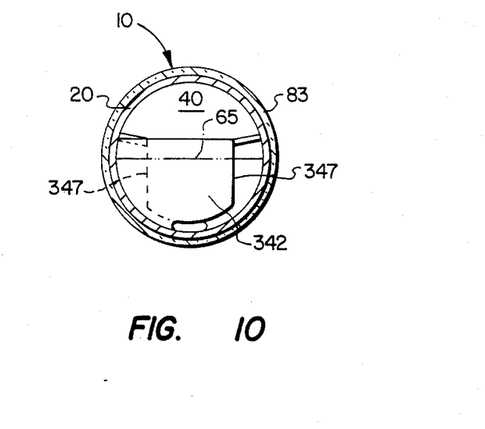

Alternate embodiments of non-stir flow baffles are shown in FIGS. 9 and 10, respectively. The baffles shown in FIG. 9 are characterized as platelike elements 242 which have a portion of their peripheral edges contiguous with the inner wall of the shell 20 and a recessed edge portion 243 defining an annular slot extending generally from the bottom of the shell 20 up to the top horizontal edge of the baffle. Alternate ones of the baffles 242 are reversed in their position within the shell 20 so as to force the fluid flowing through the settling compartment to follow a somewhat serpentine course. The baffles 242 are preferably used for treating fluids with heavy emulsification of fairly low concentrations of oil in the carrier liquid.

The baffles 342 shown in FIG. 10 arranged in the same manner as baffles 242 and are similar in some aspects to the baffles 242 but are delimited by a vertical edge 347 to increase the slot area between the baffle and the shell inner wall. The baffles 342 are used in applications of the apparatus 10 where the concentration of oil in the carrier liquid is substantial.

In certain applications of the apparatus it may be preferred to include, at spaced intervals, full section coalescing units 46 through which the conditioning solution is required to flow to enhance the coalescence of the dispersed oil and gas particles. The coalescing units 46 may be characterized as screened baskets packed with means for coalescing the dispersed fluids, such means including, for example, raschig rings or berl saddles.

Figure 5:
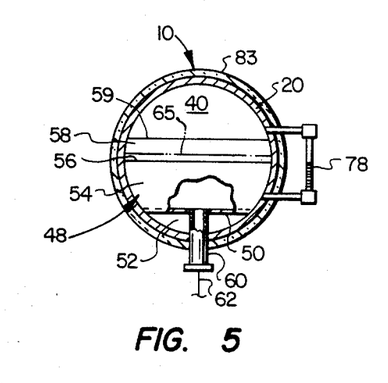
FIG. 5 is a section view taken along the line 5—5 of FIG. 2.

Referring now to FIGS. 2, 2A and 5, the apparatus of the present invention includes a reservoir, generally designated by the numeral 48, for collecting oil separated from the conditioning liquid. The reservoir 48 comprises a bottom wall 50 which is disposed above the bottom of the shell 20 to provide a flow passage 52 thereunder. The reservoir 48 also includes a weir 54 having an upper generally horizontal edge 56 and a back wall 58 having an upper generally horizontal edge 59. The upper edge 56 of the weir 54 is preferably formed to be approximately one inch below the horizontal center plane of the shell 20. The upper edge 59 of the back wall of the reservoir is preferably formed to be at least three inches higher than the edge 56. The oil collection reservoir 48 includes an outlet conduit 60 extending downward from the bottom wall 50 and connected to a flow line 62 having interposed therein a motor operated valve 64. The upper edge 56 of the reservoir front wall forms an oil overflow weir which will permit a layer of oil separated from the carrier liquid to flow over the weir and into the interior of the reservoir 48 and then be conducted out of the vessel through the outlet conduit 60.

Figure 6:
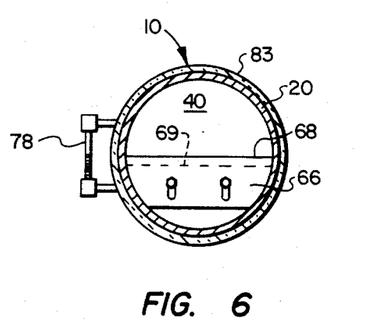
FIG. 6 is a section view taken along the line 6—6 of FIG. 2.

The separated conditioning solution flows under the reservoir 48 through the passage 52 and is then allowed to flow over an adjustable level control weir 66 as shown also in FIG. 6. The weir 66 includes an upper level control edge 68 the height of which may be adjusted with respect to a vertical plate type dam 69 to control the interface between oil and conditioning solution on the upstream side of weir 54. The weir 66 may comprise a plate which is bolted to the dam 69 by suitable bolts extending through vertical slots in the weir plate to permit vertical adjustment of the weir as needed. Accordingly, depending on the predetermined thickness of the oil layer, generally designated by the numeral 61 in FIGS. 2 and 2A, the interface level of the oil and conditioning solution in the vessel 10 may be controlled to assure that all of the oil is made to flow over the edge 56 of weir 54 and the carrier liquid flows under the oil reservoir 48 via passage 52, over the edge 68, and into a reservoir portion 70 formed between the dam 69 and head 24. The separated liquid in the reservoir portion 70 is discharged from vessel 10 through the outlet conduit 14 having a diaphragm type or other motor operated valve 74 interposed therein. The reservoir 70 as well as the reservoir 48 are both provided with suitable liquid level control devices 77 adapted to control the operation of the valves 64 and 74, respectively, to maintain a predetermined level of glycol-free oil in the reservoir 48 and oil-free conditioning liquid in the reservoir 70. The vessel 10 may also be provided with suitable level sight gages 78 in communication with each reservoir as illustrated in FIGS. 2, 5 and 6.

Figure 7:
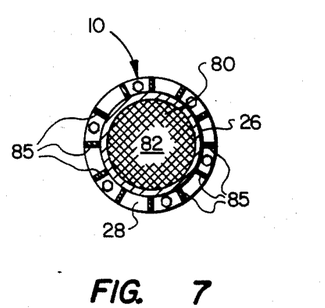
FIG. 7 is a section view taken along the line 7—7 of FIG. 2.

Referring to FIG. 2 and to FIG. 7, the gas separator tower portion 26 is preferably provided with suitable spaced apart gas-liquid mist separator or agglomerator elements 80 which are disposed horizontally across the interior chamber 82 of the tower for removing minute liquid particles entrained in the separated gas flowing from the interior chamber 40 of the vessel 10. The elements 80 may comprise a fine mesh screen wire or other foraminous structure. Additional fine particle Demister TM elements or other devices using fibrous materials may be added and retained in the space between the elements 80, if required. As illustrated in the drawings, the entire horizontal shell 20 and end heads 22 and 24 of the vessel are provided with a suitable thermal insulation cover generally designated by the numeral 83. The insulating cover 83 may comprise a suitable insulating material such as fiberglass or magnesia block insulation. The gas separator tower 26 is uninsulated and may be fabricated with heat exchange means such as vertically extending, radially projecting cooling fins 85 formed on the outer cylindrical wall of the gas separator tower. The provision of the cooling fins 85 enhances the extraction of heat from the gas passing through the collection tower 26 to the atmosphere to condense hydrocarbon vapors from the gas. Gas separated from the conditioning solution and flowing through the tower 26 is discharged from the tower via a conduit 90 having a suitable back-pressure regulator valve 92 interposed therein to maintain a predetermined pressure within the interior of the tower 26 and the vessel 10. The separated gas flowing through the conduit 90 may be injected in the process fuel system, to a reboiler sparger, or vented and burned in a flare. The separator tower 26 is preferably located directly over the reservoir 48 so that condensate formed and mist collected in the tower may drop into the reservoir. By removing the tower 26, the opening formed by the nozzle 32 is sufficiently large to permit access to the adjustable weir 66 so that the height of the control edge 68 may be adjusted in accordance with operating requirements of the apparatus.

A parameter of longstanding in the design of pressure vessels for processes and similar uses is that a vessel length to diameter ratio of approximately 3.5 results in the least cost of a vessel for a given volume. Although this ratio has dominated the thinking in the development of cylindrical pressure vessels, including separator devices, it has been determined in accordance with pursuing the present invention that such a configuration will not work satisfactorily for separating hydrocarbon oils from glycol and other gas conditioning solutions. It has been discovered that a length to diameter ratio for a cylindrical, generally horizontally oriented separator vessel in the range of approximately 6.0 has produced superior separation characteristics. This length to diameter ratio applies particularly to the length of the settling compartment which, in the vessel 10, extends substantially from the head seam 23 to the weir 54 of the oil reservoir. Moreover, it is preferred that a separator vessel in accordance with the present invention have a length to diameter ratio from head seam 23 to head seam 25 of approximately 8.0. Furthermore, it has also been determined that in a separator for removing dissolved gases and emulsified oils from gas conditioning liquids such as ethylene glycol, diethylene glycol, triethylene glycol, tetratethylene glycol, monoethanolamine, diethanolamine, 2-(2-aminoethoxy)ethanol (Diglycolamine TM) and other hydrophilic organic-gas conditioning solutions, that the vessel should be filled approximately to its horizontal centerline and no more than two thirds of its diameter shall be occupied by the liquid-gas emulsion so that an adequate gas-liquid surface area, ample upper space for separating dissolved gases, and short liquid columns are available at all times.

As mentioned previously the oil overflow weir formed by the edge 56 of the weir 54 is substantially horizontal so that an oil layer may be skimmed or decanted from the top of the glycol or other carrier liquid. The interface of the oil and the separated conditioning liquid is indicated generally by the dashed line 63 in FIGS. 2 and 2A, and the gas-liquid interface is indicated by the line 65. A well defined oil layer 61 normally does not form completely except in the last one or two settling compartment sections immediately upstream of the weir 54, and particularly in the section of the settling compartment defined, in part, by the weir 54 and one of the non-stir baffles.

In the operation of the apparatus of the present invention a feedstream of a three phase liquid-gas emulsion is introduced into the vessel 10 through the inlet conduit 12 from the gas conditioning system. In accordance with the concentration of oil in the emulsion the coalescer sections 46 may be interposed in the settling compartment, as required, and the height of the weir 66 will be adjusted to control the position of the interface 63 in accordance with the thickness of the oil layer 61 desired or obtained at the end of the settling compartment. Depending on the absolute viscosity of the solution being treated, the temperature of the feedstream shall be maintained in a particular range normally above ambient temperature. For separating gas and oil from glycols, for example, the feed solution should be maintained at a temperature in accordance with the desired viscosity as discussed hereinbelow.

The operating pressure of the apparatus may be varied to some degree according to the design of the regeneration system and the design pressure of the vessel itself. However, most applications will require working pressures in the interior of the vessel 10 in the range of 20 to 75 psig. This pressure may, of course, be adjusted by an appropriate setting of the back-pressure regulator 92. The operating pressure is preferably set at the lowest value that will provide sufficient pressure to overcome the pressure drop through the conditioning liquid flow system so that the liquid may be suitably fed to the regenerator still. The flow rate of the feedstream is controlled so that the residence time of the flowstream from entering into the settling compartment to separation at the oil overflow weir formed by the edge 56 is more than five minutes but preferably less than sixty minutes. A preferred residence time is on the order of thirty minutes; however, residence time will be dictated by the density of the oil, the viscosity of the carrier liquid, and the operating temperature of the separator.

Figure 8:
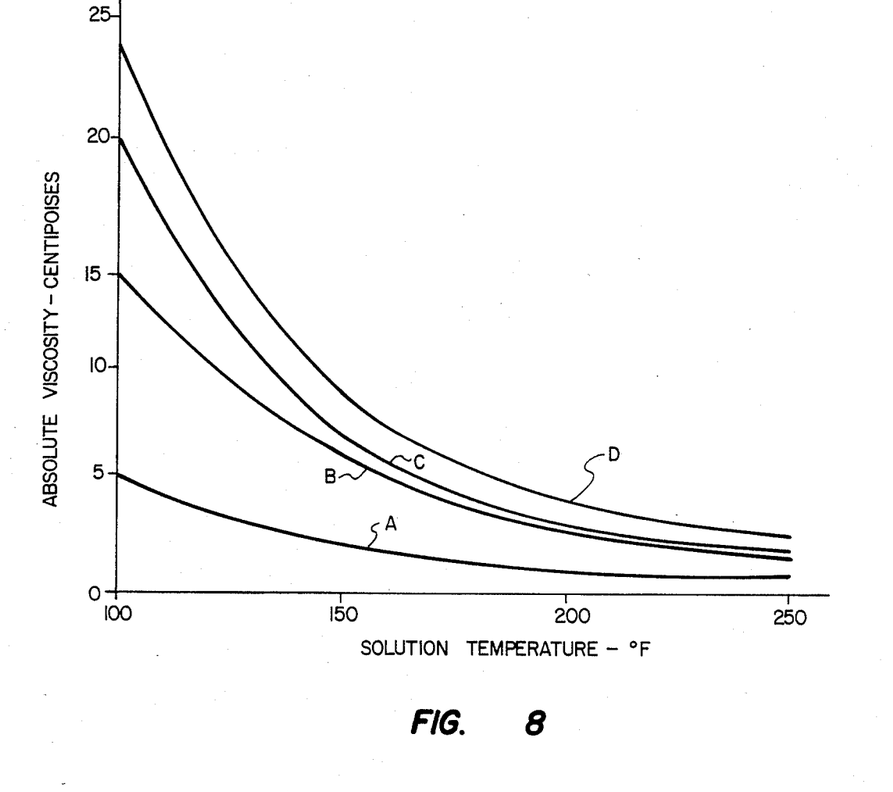
FIG. 8 is a diagram illustrating temperature vs. viscosity for typical gas treating solutions.

In accordance with another important operating parameter of the present invention it has been determined that the absolute viscosity of the carrier liquid should be maintained at approximately 8.0 centipoise or less at all times during residence in the separator compartment delimited by the weir 54 and the head 23. This parameter may be controlled by controlling the temperature of the feedstream entering the vessel 10, by water dilution of the feedstream, or by controlling both factors. For example, an ethylene glycol solution containing 20% water can be treated at a temperature of no more than 100° F. whereas a diethylene glycol solution containing 5% water would be required to be held at a temperature of at least 135° F. to maintain an absolute viscosity of 8.0 centipoises. FIG. 8 illustrates the viscosity of four typical gas treating solutions vs. temperature. Line A represents the variation of viscosity with temperatures of solution of 80% ethylene glycol, and lines B, C, and D represent solutions of 95% diethylene glycol, 95% triethylene glycol and 95% tetraethylene glycol, respectively.

Although a preferred apparatus and process for the separation of emulsified oil and dissolved gas from a gas conditioning solution has been described, substitutions and modifications may be made to the apparatus and process, as will be readily apparent to those skilled in the art, without departing from the scope and spirit of the invention which is defined in the appended claims.

What is claimed is:

1. Apparatus for separating hydrocarbon oils from a gas conditioning process liquid, comprising:

an elongated generally cylindrical pressure vessel adapted to be disposed such that its longitudinal central axis extends substantially horizontally, a feedstream inlet conduit for introducing a mixture of oil dispersed in a gas conditioning liquid into one end of said vessel, a settling compartment formed in said vessel extending toward an oil overflow weir in said vessel, conduit means for conducting liquid separated from said oil from said vessel, and means for controlling the settling of said mixture in said vessel sufficient to separate substantially all of said oil from said liquid including spaced apart baffle means in said settling compartment, said baffle means being positioned and arranged so as to substantially eliminate turbulent and vertically downward flow of said mixture while providing for continuous through flow of said mixture toward said oil overflow weir, said baffle means comprising a set of vertically extending plates spaced apart in said settling compartment along said central axis, said plates being configured such that alternate ones of said plates define a peripheral slot extending along and between each of said ones of said plates and a wall of said vessel defining said settling compartment, each of said slots extending at least from an edge of said ones of said plates toward the bottom of said settling compartment to provide for generally horizontal laminar stratified flow of said liquid through said settling compartment.

2. The apparatus set forth in claim 1 wherein:
the other of said plates include a centrally disposed opening in each of said other plates.

3. The apparatus set forth in claim 2 wherein:
the effective flow area of each of said openings is substantially equal to the effective flow area of each of said peripheral slots.

4. The apparatus set forth in claim 1 wherein:
each of said plates are spaced apart about two feet.

5. Apparatus for separating hydrocarbon oils from a gas conditioning liquid, comprising:

an elongated pressure vessel adapted to be disposed such that its longitudinal central axis extends substantially horizontally, a feedstream inlet conduit for introducing a mixture of oil dispersed in a gas conditioning liquid into one end of said vessel, a settling compartment formed in said vessel extending toward an oil overflow weir in said vessel, oil reservoir means formed in said vessel, conduit means for conducting conditioning liquid separated from said oil from said vessel, an interior chamber in said vessel for accumulation of gases separated from said conditioning liquid in said settling compartment, means for controlling the position of an interface between an oil layer and conditioning liquid separated from said oil in said vessel whereby said oil overflow weir allows substantially only the layer of oil separated from said conditioning liquid to flow into said oil reservoir means, and means for controlling the settling of said mixture in said vessel sufficient to separate substantially all of said oil from said conditioning liquid and comprising a first set of vertically extending baffle plates spaced apart one from the other along said central axis and each extending transversely across said settling compartment and each defining an opening extending between a wall of said vessel and an edge of said plates of said first set, respectively, and a second set of baffle plates, interposed, respectively, between adjacent ones of the plates of said first set, each of said plates of said second set having an opening disposed with respect to the openings of said plates of said first set whereby a major portion of said mixture is caused to flow continuously in a substantially horizontal stratified serpentine path from said one end of said vessel toward said oil overflow weir without turbulent flow and without mixing or stagnation of said mixture to provide for separation of oil from said conditioning liquid.

6. The apparatus set forth in claim 5 wherein:
all of said baffle plates are spaced apart about two feet.

7. The apparatus set forth in claim 5 further comprising:
means interposed in the flow path of all of said mixture through said settling compartment for coalescing dispersed oil and gas bubbles in said conditioning liquid to promote the formation of said oil layer at the end of said settling compartment defined by said oil overflow weir.

8. The apparatus set forth in claim 5 wherein:
said oil overflow weir comprises a horizontal edge of a wall extending across said settling compartment and forming, in part, said oil reservoir means.

9. The apparatus set forth in claim 8 wherein:
said oil reservoir means includes a bottom wall, and a back wall spaced from said edge, said back wall being vertically higher than said edge defining said oil overflow weir, said oil reservoir means being interposed between said settling compartment and said means for controlling the position of said interface, and said vessel includes a passage formed between said settling compartment and said means for controlling the position of said interface in said vessel for conducting oil-free conditioning liquid therethrough.

10. The apparatus set forth in claim 5 wherein:
said means for controlling the position of said interface includes an adjustable weir disposed in said vessel and operable to control the level of conditioning liquid separated from said oil.

11. The apparatus set forth in claim 10 wherein:
said adjustable weir defines, in part, a conditioning liquid reservoir for receiving conditioning liquid separated from said oil, said conditioning liquid reservoir being in communication with said outlet conduit.

12. The apparatus set forth in claim 10 wherein:
said vessel includes a gas collection tower extending generally above said vessel and forming a second chamber in communication with said chamber in said vessel for collection and conduction of gas to a gas discharge conduit in communication with said second chamber.

13. The apparatus set forth in claim 12 wherein:
said second chamber includes mist separator means interposed therein between said chamber in said vessel and said gas discharge conduit.

14. The apparatus set forth in claim 13 further comprising:
pressure regulator means of communication with said gas collection tower for regulating the pressure in the interior of said vessel.

15. The apparatus set forth in claim 12 wherein:
said gas collection tower includes means for conducting heat from said gas in said second chamber to condense vapors in said gas flowing through said second chamber.

16. The apparatus set forth in claim 15 wherein:
said heat conducting means comprises cooling fins on said gas collection tower.

17. The apparatus set forth in claim 15 wherein:
said vessel includes an insulating blanket covering a major portion of the exterior of said vessel.

18. The apparatus set forth in claim 5 wherein:
said openings of said plates of said first set extend along the periphery of said plates of said first set from the bottom of said settling compartment toward an upper edge of said plates.

19. The apparatus set forth in claim 18 wherein:
said openings of said plates of said first set extend along one longitudinal side wall of said pressure vessel and said openings in said plates of said second set extend along the opposite longitudinal side wall of said pressure vessel.

20. The apparatus set forth in claim 5 wherein:
said openings in said plates of said second set are centrally disposed with respect to opposite longitudinal sides of said pressure vessel.

21. The apparatus set forth in claim 5 wherein:
said openings of said plates of first set have an effective flow area substantially equal to the effective flow area of said openings in said plates of said second set.

22. Apparatus for separating hydrocarbon oils from a gas conditioning liquid, comprising:
an elongated generally cylindrical pressure vessel adapted to be disposed such that its longitudinal central axis extends substantially horizontally, a feedstream inlet conduit for introducing a mixture of oil dispersed in a gas conditioning liquid into one end of said vessel, a settling compartment formed in said vessel extending toward oil overflow weir means formed in said vessel, said settling compartment having a length of at least about six times the diameter of said vessel, conduit means for conducting conditioning liquid separated from said oil from said vessel, an interior chamber in said vessel for accumulation of gases separated from said conditioning liquid in said settling compartment, means for controlling the position of an interface between an oil layer and conditioning liquid separated from said oil in said vessel whereby said oil overflow weir means allows substantially only the layer of oil separated from said conditioning liquid to flow over said oil overflow weir means, and means for controlling the settling of said mixture in said vessel sufficient to separate substantially all of said oil from said conditioning liquid and comprising a first set of vertically extending baffle plates spaced apart one from the other along said central axis and each extending transversely across said settling compartment and each defining an opening extending between a wall of said vessel and an edge of said plates, and a second set of baffle plates interposed, respectively, between adjacent ones of the plates of said first set, each of said plates of said second set having an opening disposed with respect to the openings of said plates of said first set whereby a major portion of said mixture is caused to flow continuously in a substantially horizontal stratified serpentine path from said one end of said vessel toward said oil overflow weir means without turbulent flow and without mixing or stagnation of said mixture to provide for separation of oil from said conditioning liquid.

23. In a gas conditioning system for conditioning gas by absorbing impurities in said gas with a conditioning liquid, absorber means for contacting gas with said conditioning liquid, means for regenerating said conditioning liquid including a three-phase separator connected to said absorber means so as to receive enriched conditioning liquid and dissolved gas from said absorber means, said enriched conditioning liquid including dispersed hydrocarbon oils having a density different from said conditioning liquid and from gases dissolved in said conditioning liquid, said separator comprising an elongated closed vessel including a settling compartment having a length at least about six times the width of said settling compartment, means forming an oil overflow weir delimiting said settling compartment for decanting a separated layer of oil off of said conditioning liquid, separated oil-free conditioning liquid collection and discharge means, means for controlling the settling of said enriched conditioning liquid in said vessel sufficient to separate substantially all of said oil from said conditioning liquid comprising a set of baffles in said settling compartment, said baffles being spaced apart one from the other along a longitudinal axis of said vessel, said baffles positioned and arranged so as to provide for generally horizontal laminar stratified flow of said liquids through said settling compartment, and means for limiting the flow rate of said liquids through said vessel to provide a residence time of said enriched conditioning liquid in said settling compartment of at least about five minutes to effect separation of oil and gas from said conditioning liquid, an activated carbon filtration unit in said system connected to said separator for receiving separated oil-free conditioning liquid from said separator, and a conditioning liquid regenerator connected to said filtration unit for distilling substances from said separated conditioning liquid for returning substantially water-white fully regenerated conditioning liquid to said absorber means.

24. The apparatus set forth in claim 23 wherein:
said vessel includes means for controlling the level of enriched conditioning liquid in said settling compartment to provide for a gas collection chamber in said vessel, said level controlling means maintaining a depth of said conditioning liquid between approximately one third and two thirds of the inside diameter of said vessel.

25. A process for treating an enriched gas conditioning liquid comprising an organic hydrophilic liquid selected from the group consisting of ethylene glycol, diethylene glycol, triethylene glycol, tetraethylene glycol, monoethanolamine, diethanolamine, and 2-(2-aminoethoxy) to remove emulsified oils and dissolved gases from said conditioning liquid, said process comprising the steps of:
providing an elongated closed vessel adapted to receive a feedstream of enriched conditioning liquid to be treated, said vessel including a settling compartment delimited at one end by an oil overflow weir whereby a layer of oil separated from said conditioning liquid may be allowed to flow over said overflow weir while said oil-free conditioning liquid is passed out of said settling compartment, said settling compartment including plural baffle means spaced apart one from the other along said axis and configured to form a generally horizontal stratified serpentine flow-path for said conditioning liquid from the inlet end of said settling compartment opposite said overflow weight toward said overflow weir, said vessel further including liquid level control means for maintaining a predetermined level of substantially oil-free conditioning liquid in said vessel, and liquid discharge means for conducting conditioning liquid out of said vessel;
introducing enriched conditioning liquid to be treated into said settling compartment at substantially the end of said settling compartment opposite said overflow weir;
flowing said conditioning liquid through said settling compartment at a rate which will permit said emulsified oil to separate from and rise through the oil conditioning liquid interface to collect in the oil layer before reaching said overflow weir by providing a residence time of said mixture in said settling compartment of at least five minutes to separate said oil from said conditioning liquid by regulating the position of an interface between said conditioning liquid and oil separated from said conditioning liquid whereby only the layer of oil overflows said overflow weir; and
discharging said conditioning liquid separated from said oil from said vessel.

26. The process set forth in claim 25 further comprising the step of:
treating said enriched conditioning liquid to limit the maximum absolute viscosity of said enriched conditioning liquid to approximately 8.0 centipoises.

27. The process set forth in claim 26 wherein:
the viscosity of said enriched conditioning liquid is limited by diluting said enriched conditioning liquid with water.

28. The process set forth in claim 26 wherein:
the viscosity of said enriched conditioning liquid is limited by regulating the temperature of enriched conditioning liquid in said vessel.

29. The process set forth in claim 26 wherein:
said enriched conditioning liquid is introduced into said settling compartment at a temperature in the range of 140°–200° F.

30. The process set forth in claim 25 further comprising the steps of:
regulating the level of liquid in said vessel to form a gas collection chamber in said vessel above said liquid,
allowing dissolved gases in said enriched conditioning liquid to separate in said settling compartment, and
conducting said separated gas away from said vessel through conduit means in communication with said gas collection chamber.

31. The process set forth in claim 30 further comprising the steps of:
providing said gas collection chamber with a portion constructed so as to cool said gas, and
passing said gas through said cooling chamber portion to condense hydrocarbon vapors in said gas.

32. The process set forth in claim 31 further comprising the steps of:
providing said vessel with an oil collection reservoir, and
collecting said condensed vapor in said oil collection reservoir.

33. The process set forth in claim 31 further comprising the steps of:
providing said cooling chamber portion with means for collecting liquid particulates entrained in said gas, and passing said gas through said collecting means prior to discharging said gas from said vessel.

34. The process set forth in claim 30 further comprising the step of:
controlling the pressure in said vessel by regulating the flow of gas out of said gas collection chamber.

35. The process set forth in claim 25 further comprising the step of:
maintaining the level of liquid in said settling compartment at substantially half the cross-sectional height of said settling compartment.

36. The process set forth in claim 25 further comprising the step of:
controlling the residence time of said enriched conditioning liquid in said settling compartment by regulating the position of an interface between separated conditioning liquid and an oil layer in said settling compartment to form an oil layer at said oil overflow weir of from approximately 1 inch to 6 inches.

37. The process set forth in claim 25 further comprising the steps of:
providing said vessel with at least one oil coalescing means in said settling compartment between the point of introduction of enriched conditioning liquid to said settling compartment and said oil overflow weir; and
passing said enriched conditioning liquid through said coalescing means to separate said oil from said conditioning liquid.

38. The process set forth in claim 25 further comprising the steps of:
providing said vessel with an oil collection reservoir and oil level control means for controlling the withdrawal of oil from said oil reservoir, and a conditioning liquid reservoir together with said liquid level control means for controlling the withdrawal of oil-free conditioning liquid from said conditioning liquid reservoir, and controlling the level of oil and conditioning liquid in said respective reservoirs to prevent gas separated from said conditioning liquid from exiting said vessel except through said gas conduit means.

39. A process for treating enriched gas conditioning liquid comprising an organic hydrophilic liquid selected from the group consisting of ethylene glycol, diethylene glycol, triethylene glycol, tetraethylene glycol, monoethanolamine, diethanolamine and Diglycolamine to remove emulsified oils and dissolved gases, said process comprising the steps of:
providing a closed generally cylindrical vessel adapted to receive a feedstream of enriched conditioning liquid, said vessel including gas collection chamber means, a settling compartment having a length of at least approximately six times the diameter of said vessel, means for skimming and discharging oil separated from said conditioning liquid, and separating and demisting dissolved and flash gases at controlled temperature and pressure;
introducing enriched conditioning liquid into said vessel and flowing said enriched conditioning liquid through said settling compartment at a rate which will permit said emulsified oil and said dissolved gases to separate from said conditioning liquid by;
controlling the flow rate of said conditioning liquid through said settling compartment to provide a residence time in said settling compartment of at least five minutes; and
conducting separated gas, oils and conditioning liquid out of said vessel.

40. The process set forth in claim 39 wherein:
the viscosity of said enriched conditioning liquid is limited by regulating the temperature of enriched conditioning liquid in said vessel.

41. The process set forth in claim 39 wherein:
the viscosity of said enriched conditioning liquid is limited by diluting said enriched conditioning liquid with water.

* * * * *